(12) United States Patent
Hadaaegh

(10) Patent No.: US 7,757,295 B1
(45) Date of Patent: Jul. 13, 2010

(54) METHODS AND STRUCTURE FOR SERIALLY CONTROLLED CHIP SECURITY

(75) Inventor: Ardeshir Hadaaegh, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 883 days.

(21) Appl. No.: 11/053,828

(22) Filed: Feb. 9, 2005

(51) Int. Cl.
*G06F 7/04* (2006.01)

(52) U.S. Cl. .............................. 726/26; 726/25; 726/27; 726/28; 726/29; 726/30; 726/31; 726/32; 726/33; 726/34; 726/35; 726/36; 713/189; 713/193; 713/194

(58) Field of Classification Search ............. 726/25–33, 726/34–36; 713/189, 193–194, 26
See application file for complete search history.

(56) References Cited

U.S. PATENT DOCUMENTS

| | | | | |
|---|---|---|---|---|
| 4,940,909 A | * | 7/1990 | Mulder et al. ................. | 326/38 |
| 6,122,683 A | * | 9/2000 | Ku et al. ....................... | 710/71 |
| 6,944,083 B2 | * | 9/2005 | Pedlow, Jr. .................. | 365/225.7 |
| 7,003,713 B2 | * | 2/2006 | Rodgers ....................... | 714/768 |
| 7,298,842 B2 | * | 11/2007 | Ishiguro et al. ............... | 380/44 |
| 2002/0147918 A1 | * | 10/2002 | Osthoff et al. ............... | 713/193 |
| 2003/0177373 A1 | * | 9/2003 | Moyer et al. ................. | 713/189 |
| 2004/0107377 A1 | * | 6/2004 | Wells ........................... | 713/500 |
| 2005/0060485 A1 | * | 3/2005 | Buer ............................. | 711/103 |
| 2005/0105331 A1 | * | 5/2005 | Lee et al. ..................... | 365/185.11 |
| 2006/0020746 A1 | * | 1/2006 | Brownhill et al. ............ | 711/103 |
| 2007/0115068 A1 | * | 5/2007 | Chow ........................... | 330/308 |

* cited by examiner

*Primary Examiner*—Edan Orgad
*Assistant Examiner*—Canh Le
(74) *Attorney, Agent, or Firm*—Duft Bornsen & Fishman LLP

(57) ABSTRACT

Structures and methods within an integrated circuit for controlling access to secured information embedded therein. A security block embedded within an integrated circuit (e.g., an SOC) may control authorized and unauthorized access to secured information stored within a memory of the integrated circuit. The security block may combine security key techniques and structures with a counting technique and structure such that when a maximum number of unauthorized attempts are detected, all further access to the secured information will be denied thereby rendering the IC unusable. In one aspect, the counting features may be implemented using a one time programmable register comprising a plurality of one time programmable bits such that each bit may be set to indicate detection of an unauthorized access attempt. If all bits of the OTP register are so set, the maximum number of unauthorized attempts has been detected and the circuit precludes all further access attempts.

11 Claims, 3 Drawing Sheets

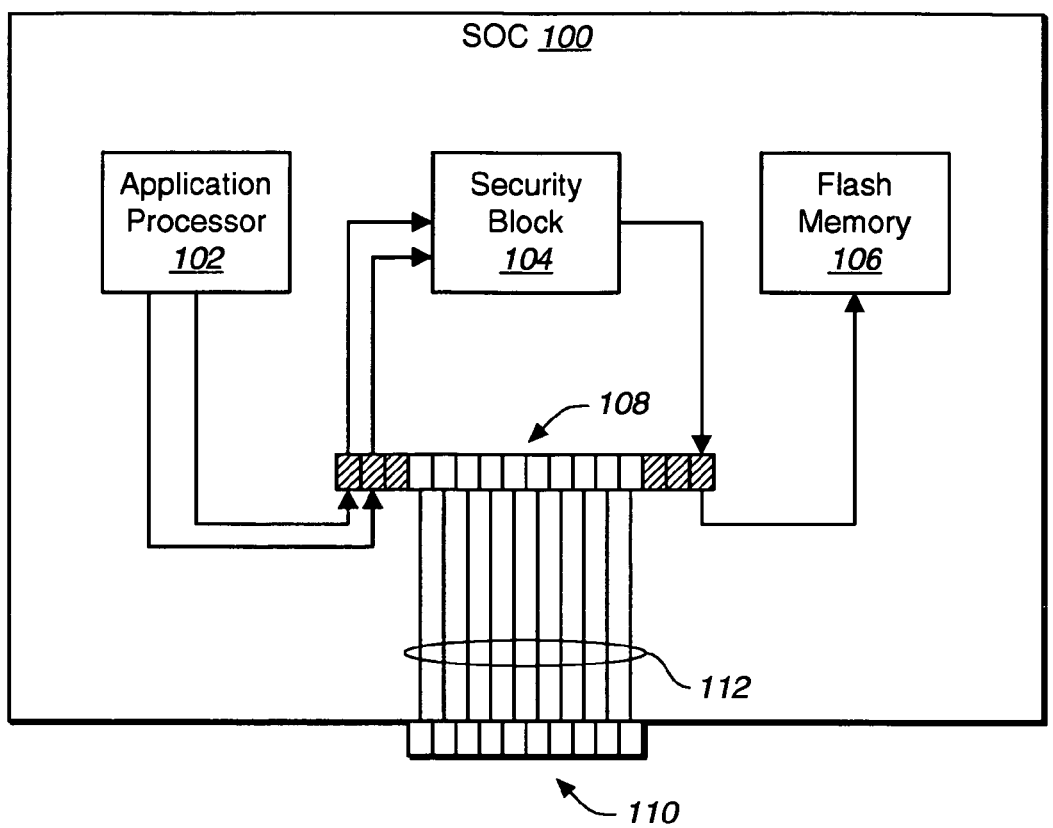
FIG._1

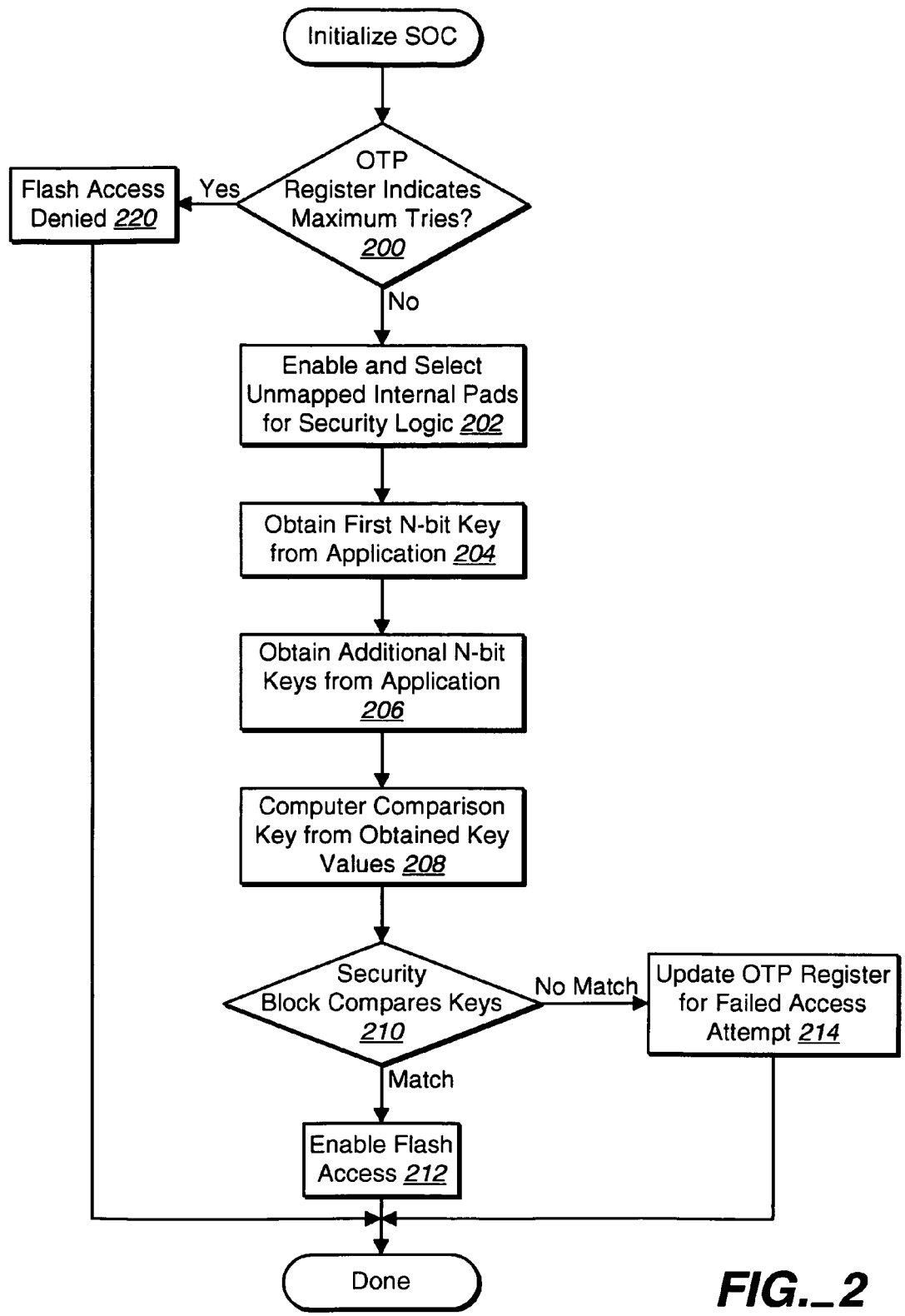
FIG._2

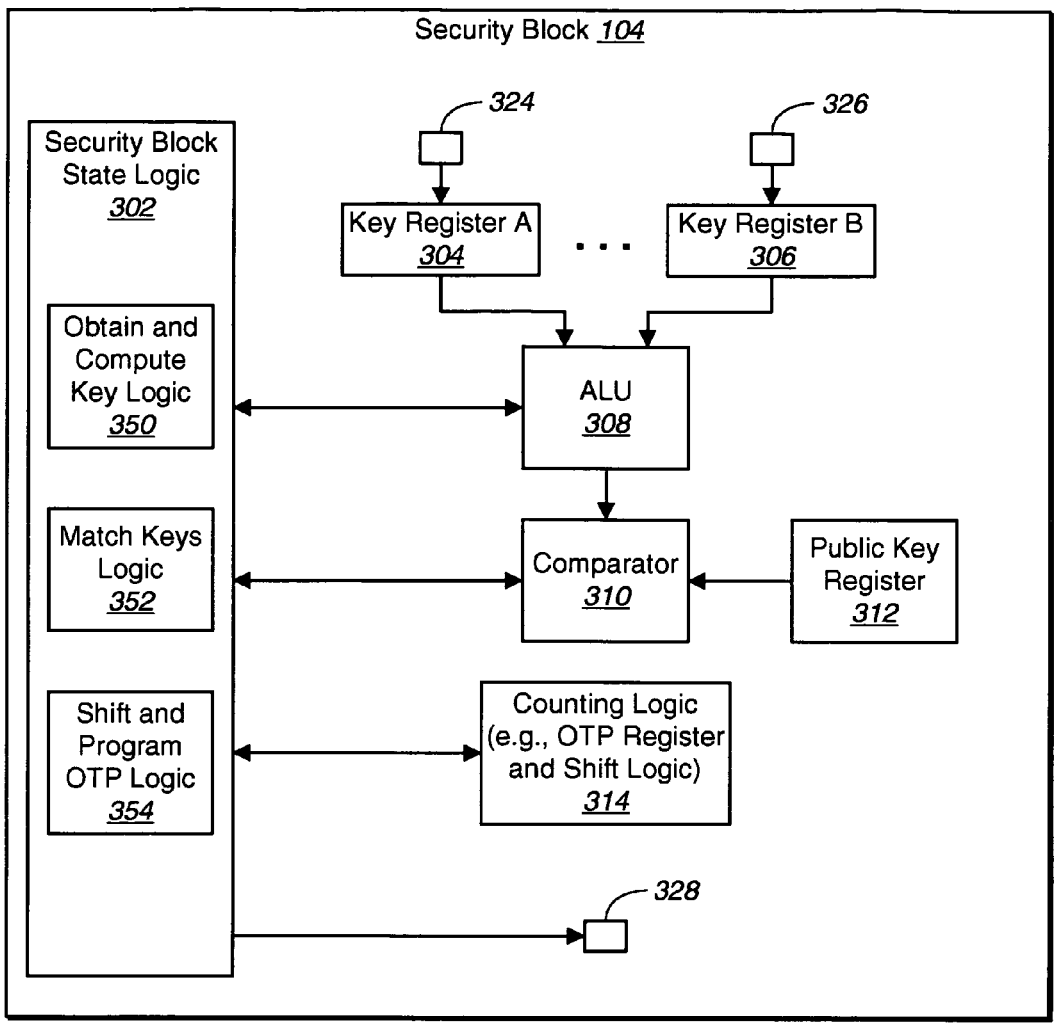
FIG._3

METHODS AND STRUCTURE FOR SERIALLY CONTROLLED CHIP SECURITY

BACKGROUND OF THE INVENTION

1. Field of the Invention

The present invention relates generally to integrated circuits having secured information stored within and, more specifically, relates to a security circuit for controlling access attempts to the secured information within the integrated circuit.

2. Discussion of Related Art

Many computing applications are commonly referred to as embedded computing applications wherein a general or special purpose processor or custom processing circuits perform a particular application embedded within the end user device or system. An end user of such an embedded system or device has little or no direct interaction with the programmed instructions or sequences of operations but rather is limited to the intended user interface features of the embedded system. Such embedded systems are ubiquitous in the present day including simple consumer devices such as telephones and household appliances as well as a variety of commercial applications including telecommunications, special purpose computing, office equipment, etc.

Many such embedded applications include information that is intended to be secured from unauthorized access. For example, the manufacturer of an embedded application device may wish to preclude any direct end user access to particular sensitive data or to the programmed instructions and data within the embedded application device. For example, security IDs or passwords stored within the embedded device may require such security from unauthorized access. Or, for example, the very code itself that operates the embedded system or device may be secured from unauthorized access to prevent unauthorized copying, reverse engineering or modification of the data and/or program instructions of the embedded system or device.

Frequently such secured embedded applications may utilize flash memory or other non-volatile programmable memory devices to store the secured information. To further enhance the security, the flash memory is often embedded and integrated with the general or special purpose processor or other processing circuits specific to the application. Further, to reduce cost and complexity of such embedded flash memories, numerous manufacturers are applying so-called Known Good Die Flash—a flash memory external to the processing circuits but intended to be packaged within the same integrated circuit. Such a flash memory may be stacked or tightly coupled to other circuit features of the embedded system integrated circuit package. Often such integration is referred to as System On a Chip or ("SOC").

Although the integrated circuit package may physically enclose such a flash memory device, hackers and thieves may exploit external pins associated with the integrated circuit to extract secured information from the flash memory circuits embedded within the SOC integrated circuit. To enhance the security of such information in a memory within the SOC integrated circuit, prior approaches have applied encryption techniques to the secured data. Thus, though a hacker or thief may find ways to exploit the external pins of the SOC integrated circuit to extract the secured data, the secured data will still be encrypted and hopefully, thereby remain secured though successfully accessed.

However, such encryption techniques give rise to numerous complexities that affect both cost and performance of the SOC integrated circuit. For example, during normal utilization of the secured information additional latencies may be incurred to provide the requisite decryption of the encrypted secured data. Further, a significant number of additional logic gates and circuits may be required to implement the required decryption of the secured information. Still further, when utilizing such encryption, it may be desirable to periodically modify the encryption key and re-record the encrypted secured information with an updated encryption key. However, an embedded device is often devoid of any external network access to allow such encryption key modifications associated with well-known public key encryption techniques.

It is evident from the above discussion that a need exists for improved security methods and structures for secured information embedded within an embedded system or device SOC integrated circuit.

SUMMARY OF THE INVENTION

The present invention solves the above and other problems, thereby advancing the state of the useful arts, by providing structures and methods for securing data within an embedded device SOC integrated circuit in a manner to preclude any access to the embedded memory storing the secured information following a sufficient number of unauthorized attempts to access the secured information. In one aspect hereof, the secured information is accessible only through security logic within the integrated circuit package that enables the memory and has no externally accessible pins or signal paths. Every attempt to access the secured information may include a provided security access key or comparison key to be compared with a predetermined security key stored within logic features and aspects hereof. Counting logic associated with the security logic counts the number of failed, unauthorized attempts to access the secured information and renders the entire SOC integrated circuit unusable after a predetermined maximum number of unauthorized attempts are detected.

One feature hereof provides a gatekeeper circuit in an integrated circuit package for securing a secured circuit in the integrated circuit package, the gatekeeper circuit comprising: a security key value register configured to store a security key value required for authorized access to the secured circuit; counting logic for indicating a number of unauthorized attempts to access the secured circuit; control logic coupled to the security key value register and coupled to the counting logic wherein the control logic is adapted to receive a comparison key from a device in the integrated circuit attempting to access the secured device and wherein the control logic is adapted to deny access to the secured circuit based upon an unauthorized attempts count derived from the counting logic and/or based on a comparison of the comparison key with the security key value.

Another aspect hereof further provides that the counting logic comprises: a one-time programmable register comprising N one-time programmable bit values; and shifting logic coupled to the one-time programmable register and coupled to the control logic and configured to set a next unprogrammed one-time programmable bit value in response to a signal from the control logic.

Another aspect hereof further provides that the control logic is adapted to receive multiple access keys from the device and wherein the control logic further comprises: a plurality of key registers each adapted for receiving and storing one of the received multiple access keys; and an arithmetic and logic unit coupled to receive the stored multiple access keys and adapted to determine the comparison key based as a function of the multiple access keys.

Another aspect hereof further provides that the arithmetic and logic unit is adapted to determine the comparison key as an arithmetic and/or Boolean function of the multiple access keys.

Another aspect hereof further provides that the control logic further comprises: a comparator adapted to receive the comparison key and the security key value and adapted to compare the comparison key to the security key value and having an output signal path and adapted to apply a signal indicating that the comparison key and security key value match or do not match.

Another aspect hereof further provides that the control logic is further adapted to increment a number of unauthorized attempts in response to the signal from the comparator indicating that the comparison key and the security key value do not match.

Another feature hereof also provides a method operable in an integrated circuit package having a secured circuit component, a method comprising: sensing an attempt to access the secured circuit; determining whether the attempt is authorized or unauthorized based on a comparison key and a predetermined security key value; responsive to the attempt being detected as authorized, allowing the attempted access to the secured circuit; and responsive to the attempt being detected as unauthorized, performing the steps of disallowing the attempted access to the secured circuit; determining whether a maximum number of unauthorized access attempts have been made; and responsive to the determination that the maximum number of unauthorized attempts have been made, disallowing all further attempts to access the secured device.

Another aspect hereof further provides that the step of sensing comprises: receiving the comparison key from a device in the integrated circuit attempting to access the secured device.

Another aspect hereof further provides that the step of sensing further comprises: receiving multiple access key values; and applying arithmetic and/or Boolean logic functions to the received multiple access keys to generate the comparison key.

Another aspect hereof further provides that the steps performed responsive to detecting the unauthorized attempt further comprises performing the step of: updating a count indicator indicative of the number of detected unauthorized attempts to access the secured device.

Another aspect hereof further provides that the count is represented as a one-time programmable register comprising a plurality of one-time programmable bit values wherein the step of updating further comprises: setting a next unprogrammed bit value of the plurality of one-time programmable bit values, and wherein the step of determining whether a maximum number of unauthorized access attempts have been made further comprises: determining whether all bits of the one-time programmable register are set.

Another feature hereof provides a system in an integrated circuit package having a secured circuit component, the system comprising: sensing means for sensing an attempt to access the secured circuit; comparison means for determining whether the attempt is authorized or unauthorized based on a comparison key and a predetermined security key value; access means coupled to the comparison means and, responsive to the attempt being detected as authorized, adapted to allow the attempted access to the secured circuit; and denial means coupled to the comparison means and, responsive to the attempt being detected as unauthorized, adapted to: disallow the attempted access to the secured circuit; determine whether a maximum number of unauthorized access attempts have been made; and responsive to the determination that the maximum number of unauthorized attempts have been made, adapted to disallow all further attempts to access the secured device.

Another aspect hereof further provides that the sensing means comprises: means for receiving the comparison key from a device in the integrated circuit attempting to access the secured device.

Another aspect hereof further provides that the sensing means further comprises: means for receiving multiple access key values; and ALU means for applying arithmetic and/or Boolean logic functions to the received multiple access keys to generate the comparison key.

Another aspect hereof further provides that the denial means are further adapted to: update a count indicator indicative of the number of detected unauthorized attempts to access the secured device.

Another aspect hereof further provides that the denial means further comprises: a one-time programmable register comprising a plurality of one-time programmable bit values; and means for setting a next unprogrammed bit value of the plurality of one-time programmable bit values, and wherein the denial means is adapted to determine whether a maximum number of unauthorized access attempts have been made by determining whether all bits of the one-time programmable register are set.

BRIEF DESCRIPTION OF THE DRAWINGS

FIG. 1 is a block diagram of an exemplary SOC integrated circuit embodying enhanced security features and aspects hereof.

FIG. 2 is a flowchart describing an exemplary method of operating enhanced security features in an integrated circuit in accordance with features and aspects hereof.

FIG. 3 is a block diagram providing additional details of exemplary security logic in accordance with features and aspects hereof.

DETAILED DESCRIPTION OF THE DRAWINGS

FIG. 1 is a block diagram of an exemplary SOC 100 embodying improved security features and aspects hereof An application processor 102 performs desired application specific processing for the SOC 100 in accordance with the particular application needs. Flash memory 106 may store secured information useful or required for normal operation of application processor 102. A variety of buses and signal paths interconnecting the application processor 102 and flash memory 106 within SOC 100 will be readily apparent to those of ordinary skill in the art. Further, those of ordinary skill in the art will readily recognize that application processor 102 may be a general purpose processor ("CPU"), a special purpose processor such as a digital signal processor or other special purpose, commercially available processors, or may be any application specific custom circuits useful four a particular desired application. Further, those of ordinary skill in the art will readily recognize that flash memory 106 may be any suitable memory device (typically non-volatile) adapted for storing secured information as well as other non-secured information useful for the particular desired application. Flash memories are one common exemplary embodiment of such a non-volatile memory useful in embedded applications for storing secured information such as program instructions or other keys, IDs and passwords required for a secured application. Numerous other standard, commercially available memory components may be utilized for such a feature and are well known to those of ordinary skill in the art.

Security block 104 comprises logic circuits implementing features and aspects hereof to detect and prevent unauthorized access to the contents of flash memory 106. Other features and aspects hereof embodied within security block 104 provide counting logic to count the number of such detected unauthorized access attempts. When the number of detected unauthorized access attempts reaches a predetermined maximum threshold, security block 104 may prevent all further access to flash memory 106 rendering SOC 100 essentially unusable.

Interconnections between security block 104 and application processor 102 as well as those between security block 104 and flash memory 106 may be routed completely within the integrated circuit package of SOC 100 so as to further secure features of SOC 100 from external stimulus hacking and theft. Such internal connections may preferably be routed through I/O pads 108 within SOC 100. Pads 108 represent signal path nodes to which external pins 110 may be bonded. External pins 110 may be bonded via wire paths 112. Typically, numerous internal pads 108 remain unmapped or unassigned with respect to external pins 110. Such unmapped or unassigned internal pads 108 are shown as shaded in FIG. 1.

One or more input signals to security block 104 may be provided by the application processor 102 to provided, for example, one or more key values required for authorized access to flash memory 106. If security block 104 detects that an access attempt by processor 102 is authorized as indicated by supplying the correct key value(s) from application processor 102, an appropriate enable signal may be generated by security block 104 and applied through an unmapped I/O pad 108 to an enable signal associated with flash memory 106. Only when such an enable signal is provided by security block 104 may application processor 102 access and manipulate secure information within flash memory 106.

The structure of FIG. 1 enhances security of SOC 100 in a number of manners. First, the signal paths associated with enabling flash memory 106 are all internally routed within the integrated circuit package of SOC 100. Secondly, a security key value or values must be properly supplied by application processor 102 to cause security block 104 to generate the requisite enable signal for flash memory 106. Further, as noted above, security block 104 may include counter logic such that when a maximum number of unauthorized access attempts are detected, all further access (authorized or unauthorized) to flash memory 106 may be precluded.

FIG. 1 is intended to be merely suggestive of an exemplary architecture for SOC 100 to implement features and aspects hereof to enhance security of secured information stored in a memory embedded within the SOC 100 integrated circuit package. Numerous equivalent architectures will be readily apparent to those of ordinary skill in the art. Additional details of exemplary methods and structures for security block 104 are discussed further herein below.

In particular, those of ordinary skill in the art will recognize that the security block 104 features may be tightly integrated within flash memory 106, within application processor 102, distributed within both processor 102 and memory 106, or may be, as depicted, a discreet component within SOC 100. Still further, those of ordinary skill in the art will recognize that all the elements of SOC 100 may be tightly integrated within the integrated circuit package or may be implemented as discrete components within SOC 100 such as may be achieved in standard cell design methodologies. Such design choices are well known to those of ordinary skill in the art.

FIG. 2 is a flowchart describing an exemplary method of operating the enhanced security features and aspects hereof As noted above, the security features and aspects hereof may be implemented within discrete components distinct from any processor and memory of the integrated circuit or may be tightly integrated within one or more of the application processor and any secured data storage (e.g., flash memory). Therefore, the method steps described herein with respect to FIG. 2 may be operable in a distributed manner in any or all of the functional components shown in FIG. 1 as integrated within and SOC 100.

In general, when the SOC (e.g., SOC 100 of FIG. 1) is initialized, security features and aspects hereof are operable as exemplified in FIG. 2 to enable or disable access to the secured information (e.g., access to a flash or other memory device storing secured information). Though shown in FIG. 2 as an aspect of SOC initialization, the method steps of FIG. 2 may be easily modified to be performed at any desired time during operation of the integrated circuit. For example, access to secured information may be enabled and disabled based upon a current operating state of the integrated circuit as appropriate for a particular application.

Element 200 of FIG. 2 is first operable (e.g., during initialization of the integrated circuit SOC) to determine whether the OTP ("one time programmable") register indicates that the maximum number of unauthorized attempts have been made to access the secured information. If so, element 220 is operable to deny further access to the secured information (e.g., to disable further operation of the flash memory or, more precisely, to never enable operation of the memory containing the application's secured information.). As described herein, counting logic circuits that tracks the number of unauthorized attempts to access the secured information may be implemented as any of several well-known circuit designs. For example, a one time programmable register comprising a plurality of one time programmable bits may be utilized such that each bit, when set, corresponds to one unauthorized access attempt. When all such programmable bits of the OTP register are so set, element 200 may then so determine that the maximum number of unauthorized attempts has been reached or exceeded. Numerous other structures and associated equivalent method steps for detecting the number of unauthorized access attempts will be readily apparent to those of ordinary skill in the art.

If element 200 determines that the maximum number of unauthorized attempts has not been reached, element 202 is next operable to select and/or enable unmapped internal I/O pads for further operation of the security check control hereof. As noted above, in one exemplary embodiment of features and aspects hereof, signals associated with security may be routed exclusively internal to the integrated circuit SOC using unmapped I/O pads. By not routing any security related signals to I/O pads and pins accessible external to the integrated circuit, security is further enhanced. Still further, the particular internal pads selected may be altered at time of bonding in the manufacture of the SOC integrated circuit to there by further enhance security. A hacker or thief will not know apriori which signal pads may route security signals within a particular SOC integrated circuit.

Element 204 is operable to obtain a first N-bit key value to be used for comparison against a predetermined security key value. The number of bits ("N") provided for such a comparison key as well as the corresponding security key value may be any number of bits suitable for the desired level of security. For example, 256 bits may be may provide adequate security in a wide variety of applications, in particular, when combined with other security features and aspects hereof. The provided key value may be obtained from the application processor or application related circuits of the SOC integrated circuit. Regardless of the source from which the first key value is obtained, the security logic features and aspects hereof may utilize the key for comparison with a predetermined security key value stored within the security logic features hereof.

Optionally, multiple such keys may be obtained from the application and combined to generate a comparison key value for comparison with the predetermined security key value. Element 206 therefore represents processing to obtain any additional key values to be used in determining a comparison key. Element 208 then logically and/or arithmetically combines all obtained key values to determine a comparison key. For example, multiple key values may be arithmetically combined using addition, subtraction, multiplication, and division and the values may be logically combined using Boolean and, or, and shifting functions. Such arithmetic and Boolean logic combinations of multiple key values may produce a more complex comparison key value to further enhance security of the stored, secured information.

Whether the comparison key is directly obtained from the application as described in element 204 or derived from multiple key values combined as described by elements 204 through 208, element 210 is then operable to compare the obtained or generated comparison key with a predetermined security key value associated with the security block features hereof. If the comparison key does not match the predetermined security key value, element 214 is operable (without enabling access to the memory device) to update the OTP register as described above to indicate another unauthorized, failed attempt to access the secured information. As noted above, the exemplary OTP implementation may comprise a plurality of programmable bits such that the operation of element 214 programs a next unprogrammed bit in the OTP register. If element 210 determines that the comparison key (directly supplied by element 204 or computed by operation of element 208) matches the predetermined security key value, element 212 is operable to enable access to the secured information (e.g., by enabling access to the flash memory device). Other operation of the initialized SOC integrated circuit may then continue with access to the secured information in accordance with the desired application features.

Those of ordinary skill in the art will recognize a wide variety of similar method steps for initializing an integrated circuit with secured information in accordance with security features and aspects hereof. The method of FIG. 2 is therefore intended merely as suggestive of all such equivalent methods utilizing security key features hereof and counting logic to enable access to secured information or to disable access to secured information.

FIG. 3 is a block diagram providing additional details of one exemplary embodiment of security block 104 as shown in FIG. 1 in which methods shown in FIG. 2 may be operable. As noted above, the methods and functional blocks of security features and aspects hereof may be implemented in components discrete from application processing and the memory device storing the security information or may be tightly coupled and integrated therewith. In all cases, the security logic features hereof are integrated with the secured information and application processing within a single integrated circuit package to provide further enhanced security.

Security block 104 as shown in FIG. 3 may include security control logic 302 providing overall control of the security features and aspects hereof. Functional elements within security logic 302 may include logic 350 to obtain key value information supplied by the integrated circuit application as well as to compute or derive a comparison key from the obtained key values. Security logic 302 may also include key matching logic 352 for comparing a derived comparison key value with a predetermined security key value stored within the security logic 302. Further, security logic 302 may include shifting and programming logic 354 for programming unprogrammed bits in an OTP register or other counting logic for storing the number of unauthorized attempts to access the secured information.

A first supplied key value may be applied to unmapped I/O pad 324 by application processing features within an integrated circuit. The bits of the key value may be serially clocked through the I/O pad into register A 304 using well known serial communication techniques and circuits. The first key value so obtained may be stored in a register A 304 for later computation of a comparison key value. A second or any subsequent key value may be obtained through another unmapped I/O pad 326 and stored within register be 306 for subsequent computation in determining a comparison key value. All stored, key values in registers 304 through 306 may then be applied as inputs to arithmetic and logic unit ("ALU") 308 to determine a comparison key value. The comparison key value so determined may be applied as an output from ALU 308 to an input path of comparator 310. A second input of comparator 310 is received from public key register 312 in which a public security key value may be stored. Comparator 310, under control of key matching logic 352 in security logic 302, may then compare the derived comparison key value with the public security key value to determine whether the keys match. When the keys fail to match, shift and program logic 354 within security logic 302 may program an unprogrammed bit within OTP register 314 to indicate detection of another unauthorized attempt to access the secured information. If the key matching logic 352 within security logic 302 using comparator 310 determines that the compared keys matched, an enable signal may be applied to I/O pad 328 within the integrated circuit for application to the memory storing the secured information to permit authorized access to the stored, secured information.

Those of ordinary skill in the art will recognize a wide variety of equivalent structures for implementing security block 104. FIG. 3 is therefore intended merely as suggestive of one possible exemplary embodiment of such a security block.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A gatekeeper circuit in an integrated circuit package for securing a secured circuit in the integrated circuit package, the gatekeeper circuit comprising:

a security key value register configured to store a security key value required for authorized access to the secured circuit;

counting logic for indicating a number of unauthorized attempts to access the secured circuit;

control logic coupled to the security key value register and coupled to the counting logic wherein the control logic is adapted to receive a comparison key from a device in the integrated circuit attempting to access the secured circuit and wherein the control logic is adapted to deny access to the secured circuit based upon an unauthorized attempts count derived from the counting logic and/or based on a comparison of the comparison key with the security key value,
wherein the counting logic comprises:
a one-time programmable register comprising a plurality of one-time programmable bit values; and
shifting logic coupled to the one-time programmable register and coupled to the control logic and configured to set a next unprogrammed one-time programmable bit value in response to a signal from the control logic.

2. The circuit of claim 1 wherein the control logic is adapted to receive multiple access keys from the device and wherein the control logic further comprises:
a plurality of key registers each adapted for receiving and storing one of the received multiple access keys; and
an arithmetic and logic unit coupled to receive the stored multiple access keys and adapted to determine the comparison key based as a function of the multiple access keys.

3. The circuit of claim 2 wherein the arithmetic and logic unit is adapted to determine the comparison key as an arithmetic and/or Boolean function of the multiple access keys.

4. The circuit of claim 1 wherein the control logic further comprises:
a comparator adapted to receive the comparison key and the security key value and adapted to compare the comparison key to the security key value and having an output signal path and adapted to apply a signal indicating that the comparison key and security key value match or do not match.

5. The circuit of claim 4 wherein the control logic is further adapted to increment a number of unauthorized attempts in response to the signal from the comparator indicating that the comparison key and the security key value do not match.

6. In an integrated circuit package having a secured circuit component, a method comprising:
Detecting an attempt to access the secured circuit;
determining whether the attempt is authorized or unauthorized based on a comparison key and a predetermined security key value;
responsive to the attempt being detected as authorized, allowing the attempted access to the secured circuit; and
responsive to the attempt being detected as unauthorized, performing the steps of:
disallowing the attempted access to the secured circuit;
determining whether a maximum number of unauthorized access attempts have been made; and
responsive to the determination that the maximum number of unauthorized attempts have been made, disallowing all further attempts to access the secured circuit, wherein the steps performed responsive to detecting the unauthorized attempt further comprises performing the step of:
updating a count indicator indicative of the number of detected unauthorized attempts to access the secured circuit,
wherein the count is represented as a one-time programmable register comprising a plurality of one-time programmable bit values wherein the step of updating further comprises:
setting a next unprogrammed bit value of the plurality of one-time programmable bit values, and wherein the step of determining whether a maximum number of unauthorized access attempts have been made further comprises:
determining whether all bits of the one-time programmable register are set by reading all bits of the one-time programmable register and applying shifting logic to determine if all bits are set.

7. The method of claim 6 wherein the step of detecting comprises:
receiving the comparison key from a device in the integrated circuit attempting to access the secured circuit.

8. The method of claim 6 wherein the step of detecting further comprises:
receiving multiple access key values; and
applying arithmetic and/or Boolean logic functions to the received multiple access keys to generate the comparison key.

9. Apparatus within an integrated circuit package having a secured circuit component, the apparatus comprising:
detecting means for detecting an attempt to access the secured circuit;
comparison means for determining whether the attempt is authorized or unauthorized based on a comparison key and a predetermined security key value;
access means coupled to the comparison means and, responsive to the attempt being detected as authorized, adapted to allow the attempted access to the secured circuit; and
denial means coupled to the comparison means and, responsive to the attempt being detected as unauthorized, adapted to:
disallow the attempted access to the secured circuit;
determine whether a maximum number of unauthorized access attempts have been made; and
responsive to the determination that the maximum number of unauthorized attempts have been made, disallowing all further attempts to access the secured circuit,
wherein the denial means are further adapted to:
update a count indicator indicative of the number of detected unauthorized attempts to access the secured circuit,
wherein the denial means further comprises:
a one-time programmable register comprising a plurality of one-time programmable bit values; and
means for setting a next unprogrammed bit value of the plurality of one-time programmable bit values, and
wherein the denial means is adapted to determine whether a maximum number of unauthorized access attempts have been made by determining whether all bits of the one-time programmable register are set by reading all bits of the one-time programmable register and applying shifting logic to determine if all bits are set.

10. The apparatus of claim 9 wherein the detecting means comprises:
means for receiving the comparison key from a device in the integrated circuit attempting to access the secured circuit.

11. The apparatus of claim 9 wherein the detecting means further comprises: means for receiving multiple access key values; and arithmetic and logic unit means for applying arithmetic and/or Boolean 5 logic functions to the received multiple access keys to generate the comparison key.

* * * * *